Feb. 25, 1930.　　　C. L. KNOPF　　　1,748,512
GEAR LUBRICANT TESTING MACHINE
Filed Aug. 18, 1928

INVENTOR
Carl L. Knopf
BY
ATTORNEYS

Patented Feb. 25, 1930

1,748,512

UNITED STATES PATENT OFFICE

CARL L. KNOPF, OF CHICAGO, ILLINOIS, ASSIGNOR TO SINCLAIR REFINING COMPANY, OF NEW YORK, N. Y., A CORPORATION OF MAINE

GEAR LUBRICANT-TESTING MACHINE

Application filed August 18, 1928. Serial No. 300,539.

This invention relates to an improved instrument for testing lubricants. This instrument is particularly useful for measuring the viscidity or resistance to flow of lubricants at low temperatures, and may therefore be called a viscidometer. This instrument is also useful in other respects which will appear.

Several peculiar problems are involved in the lubrication of transmissions and differentials in automobile machinery particularly because of the wide range of temperature over which such machinery is operated. The improved instrument of this invention is of special value and application in the determination of the characteristics of lubricants intended for such use at low temperature, in the neighborhood of 0° F. for example. This instrument makes possible a direct and reliably accurate determination of the viscidity or resistance to flow of lubricants at such temperatures and also indicates the quality of the lubricant with respect to adhesiveness and channelling and ease of gear-shifting.

The instrument of the invention comprises essentially a receptacle for holding a charge of the lubricant to be tested, a vertically movable weighted plunger, means for limiting the rate of motion of the plunger, a weighing mechanism, and means carried by the weighing mechanism for receiving and holding the lubricant receptacle in the path of motion of the plunger. The instrument indicates directly the resistance of the lubricant to motion of the plunger under standardized conditions.

One form of instrument embodying the invention is illustrated in the accompanying drawings, and the invention and its operation will be further described in more detail in connection therewith, but it is intended and will be understood that this detailed illustration and description are for the purpose of exemplification and that the invention is not limited thereto. In the accompanying drawings—

Figure 1:
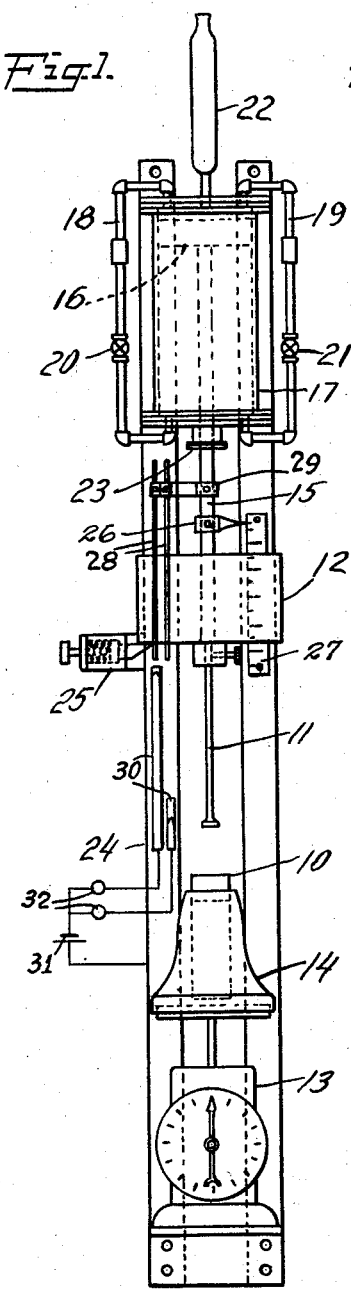
Fig. 1 is a front elevation of an assembled instrument.
Figure 2:
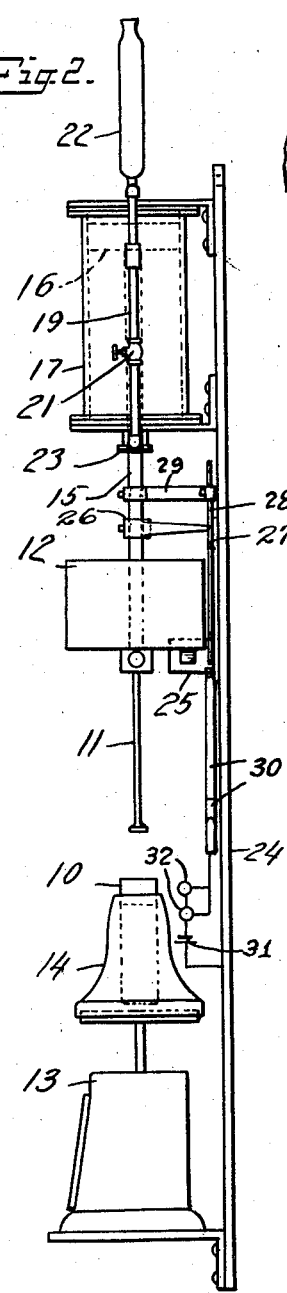
Fig. 2 is a side elevation of an assembled instrument.

The instrument illustrated in the drawings comprises a receptacle 10 for holding a charge of the lubricant to be tested, a vertically movable plunger 11, a weight 12 for driving the plunger 11 downwardly, a weighing mechanism 13 and means 14 for receiving and holding the receptacle 10 in the path of motion of the plunger 11. The plunger 11 and the weight 12 are each attached to and carried by a shaft 15 connected to a piston 16 moving in the closed cylinder 17. The opposite ends of the cylinder 17 are connected by a pair of pipes 18 and 19, a gate valve 20 being provided in pipe 18 and a needle valve 21 in pipe 19. An open riser 22 is also connected to the upper end of the cylinder 17. The plunger 11 is guided by the shaft 15 which in turn is guided by the gland 23 and the piston 16. The cylinder 17 and the weighing mechanism 13 are carried by a unitary frame 24 adapted to maintain the parts of the instrument in definitely fixed position. A catch 25 is also provided for holding the plunger 11 and the plunger mechanism in a raised position.

The receiving and holding means 14 for the lubricant receptacle on the weighing mechanism advantageously includes or is in the form of a thermal insulating jacket. In the instrument illustrated, the receiving and holding means 14 is made of thermal insulating material. The form of plunger illustrated is particularly advantageous, the lower end of the plunger consisting of a flat head, circular in section, larger in section than the plunger shank.

In operation, the limiting rate of drop of the plunger 11 is first brought to a standard value by adjusting the needle valve 21 with the gate valve 20 closed, the cylinder 17 being filled with light lubricating oil, for example. For testing a 4½" depth of lubricant in a receptacle of circular cross-section 1.3" in diameter with a plunger the lower end of which is of circular cross-section ½" in diameter under a driving weight of about 50 pounds, the limiting rate of drop of the plunger may be fixed, with advantage, at 4" in 26—27 seconds. The foregoing dimensions, rates and weights have been used successfully. The lubricant receptacle 10 is then filled with a standard depth, 4½" for example, of the lubricant to be tested and the charged receptacle brought to a standard temperature, 0° F. for example. After the charged receptacle is brought to a standard temperature, it is inserted in the holder 14 and the plunger 11 is released. As the plunger 11 enters the lubricant in the receptacle 10, a load is imposed on the weighing mechanism which usually reaches a substantially constant value before the plunger has passed through any very great depth of the lubricant. As soon as this value becomes constant, small weights equalling this force are placed on the large weight 12 to compensate for the resistance offered by the lubricant to the motion of the plunger 11. A number of readings of the force imposed on the weighing mechanism by the travel of the plunger through the lubricant are then taken as the motion of the plunger continues. These readings may be averaged.

Figure 3:
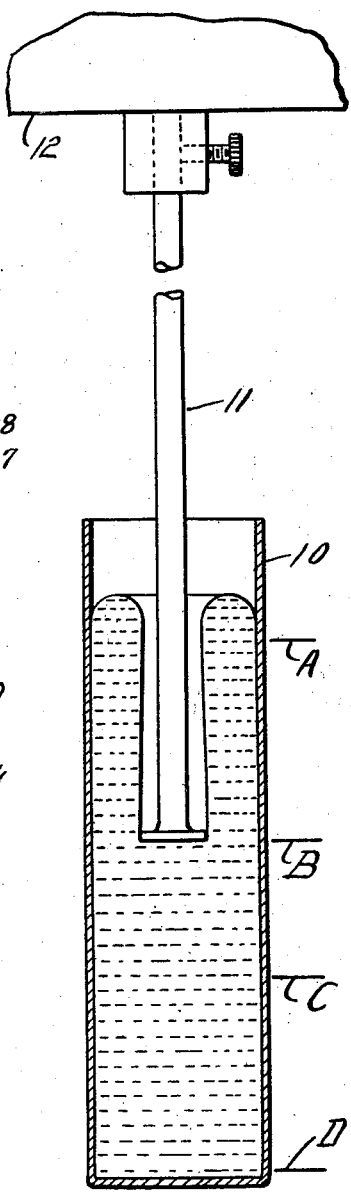
Fig. 3 is a fragmentary detail showing particularly the lubricant receptacle and the plunger end.

One convenient method of operation is to take a reading of the force imposed on the weighing mechanism shortly before the plunger reaches its midpoint of travel through the lubricant and shortly after it passes this point and to average these two readings. In Fig. 3, for example, if the original depth of lubricant is about A and the limit of motion of the plunger is about D, readings may be taken as the plunger passes B and C, points ½" above and ½" below the midpoint, respectively. The time of reading may be determined with reference to an indicator 26 attached to the plunger or plunger mechanism and moving over a scale 27 or to an electrical contacting mechanism adapted to give a visible or audible signal as the plunger passes appropriate points in its travel. The electrical contacting mechanism may comprise, for example, a pair of rods 28 adjustably supported by the arm 29 from the shaft 15 and arranged to depend into mercury cups 30. The mercury cups 30 may be supported by any suitable supporting means electrically insulated from the remainder of the apparatus. The mercury levels in the cups 30 may be differentially arranged so as to make contact at the desired points with the rods 28 as they travel downwardly with the shaft 15. The mercury cups may be electrically connected to the frame 24 through cell 31 and lamps 32. With the arrangement shown, the lamp circuits will be completed at different points in the downward travel of the shaft when the rods 28 make contact in the mercury cups. The lamps 32 may obviously be replaced by an electrically operable audible signalling device, if desired.

After the plunger stroke is completed, it is usually convenient to release the plunger proper from the plunger mechanism and to remove the lubricant receptacle and the plunger together. The plunger may then be withdrawn from the lubricant.

As has been noted, the instrument gives an indication of the quality of the lubricant in several other respects as well as giving a direct measure of its viscidity or resistance to flow. If the lubricant closes in on the plunger shank as the plunger travels downwardly therethrough, it indicates that the lubricant is non-channelling at the temperature of the test and that it will feed satisfactorily, from housing to ring gear in a differential, for example, at the temperature of the test. Lubricants which are highly adhesive at the temperature of the test tend to give high readings on the weighing mechanism because of the adhesion between the lubricant and the lubricant receptacle as the lubricant is displaced upwardly by the downward motion of the plunger. Unusually high readings on the weighing mechanism also indicate a tendency toward difficulty in gear-shifting, in transmissions for example, at the temperature of the test. An indication of the quality of the lubricant with respect to channelling is also had when the plunger is withdrawn from the lubricant receptacle.

This improved instrument measures directly the resistance of the lubricant to motion of the plunger under standardized conditions, the driving force impelling the plunger and the rate of motion of the plunger in particular, both being closely fixed. The instrument of the invention is of special value and application where the usual instruments, particularly those depending upon a measurement of the rate of flow of the lubricant to be tested, are unsatisfactory or unreliable or inaccurate because of high viscosity of the lubricant to be tested under the conditions of the test.

I claim:

1. A lubricant testing instrument comprising a receptacle for holding a charge of the lubricant to be tested, a vertically movable weighted plunger, means for limiting the rate of motion of the said plunger, a weighing mechanism, and means carried by the said weighing mechanism adapted to receive and to hold the said receptacle in the path of motion of the said plunger.

2. A lubricant testing instrument comprising a receptacle for holding a vertically movable weighted plunger, the lower end of the said plunger consisting of a flat head larger in section than the plunger shank, means for limiting the rate of motion of the said plunger, a weighing mechanism, and means carried by the said weighing mechanism adapted to receive and to hold the said receptacle in the path of motion of the said plunger.

3. A lubricant testing instrument comprising a receptacle for holding a charge of the lubricant to be tested, a vertically movable weighted plunger, means for limiting the rate of motion of the said plunger, a weighing mechanism, and means carried by the said weighing mechanism adapted to receive and to hold the said receptacle in the path of motion of the said plunger, the said receiving and holding means including a thermal insulating jacket for the said receptacle.

In testimony whereof I affix my signature.

CARL L. KNOPF.